United States Patent [19]

Galetto et al.

[11] Patent Number: 4,922,347

[45] Date of Patent: May 1, 1990

[54] APPARATUS FOR RECORDING DISPLAYED VIDEO DATA

[75] Inventors: Louis V. Galetto; Charles O. Ross, both of Endicott, N.Y.

[73] Assignee: International Business Machines Corp., Armonk, N.Y.

[21] Appl. No.: 271,911

[22] Filed: Jun. 9, 1981

[51] Int. Cl.⁵ .............................................. H04N 1/21
[52] U.S. Cl. .................................... 358/296; 358/335; 358/409
[58] Field of Search .............................. 358/296–303, 358/256, 264, 280, 283, 293, 335

[56] References Cited

U.S. PATENT DOCUMENTS

| | | | |
|---|---|---|---|
| 4,084,195 | 4/1978 | Pereiva | 358/298 |
| 4,158,203 | 6/1979 | Johnson | 346/35 |
| 4,266,251 | 5/1981 | Hara | 358/286 |
| 4,394,685 | 7/1983 | Yeomans et al. | 358/296 |

Primary Examiner—Aristotelis M. Psitos
Attorney, Agent, or Firm—John S. Gasper; Kenneth P. Johnson

[57] ABSTRACT

Apparatus for recording a displayed frame of video data by storing the binary data bits from identical segments of each video scan line, thereafter supplying the stored bits of the segments to a traversing matrix print head for recording the bits in those segments, and repeating the process with data bits from a different series of scan line segments. The number of data bits comprising a segment usually corresponds to the number of recording elements in the print head, and the number of print head excursions will vary inversely to the number of data bits in each segment. A resulting recorded video frame thus appears rotated 90° with respect to the original frame orientation.

18 Claims, 9 Drawing Sheets

(EXPANSION OF BLOCKS 171 & 172, FIG. 6)

FIG. 9
(EXPANSION OF BLOCK 137 FIG. 5)

FIG. 10
(EXPANSION OF BLOCKS 169 & 170, FIG. 6)

FIG. 11
(EXPANSION OF BLOCKS 186 & 187, FIG. 7)

APPARATUS FOR RECORDING DISPLAYED VIDEO DATA

BACKGROUND OF THE INVENTION

This invention relates generally to recording apparatus and more particularly to matrix printing systems capable of producing a printed recording or hard copy of a video frame appearing on a cathode ray tube display device.

When using a cathode ray tube display terminal in a computer system, a permanent record of a frame is often desirable. The exhibited data are in the form of binary bits controlling the unblanking of the electron beam that is being repeatedly scanned across the face of the CRT. Each display frame is thus formed of a matrix of fluorescent dots with each dot representing the presence of a binary bit. Source data are generally provided from a random access memory to permit regeneration of the frame as long as required.

Hard copy printers, because of their relative slowness, require a form of buffer storage into which the binary data are read from the data source and temporarily retained until the printer can complete the job much later. The frame data can be obtained either from the memory of the display device or directly from the video input to the CRT display.

Buffer storage arrangements for hard copy printers in the past have used two techniques to capture the bit data for the frame. Either character codes are transmitted from the display to a character generator for the printer and the information recorded, or each scan line is captured and recorded singly in succession. The former technique has the advantage of tying up the display unit for the minimum time.

However, this method requires a larger amount of buffer storage since more bits must be held in storage concurrently. The latter technique requires storage for only a single scan line of bits, but the printer must record each line before the next can be stored. Thus use of the display unit is delayed until all lines are sequentially printed. An example of this technique is the system shown in U.S. Pat. No. 4,158,203 and the printing device must be equal in length to a full scan line, usually having several hundred elements.

OBJECTS AND SUMMARY OF THE INVENTION

It is accordingly a primary object of this invention to provide display copier apparatus that can store data representative of a predetermined segment of a plurality of video scan lines and record the segments during a single pass of the recording head, thus reducing recording time and cost.

Another object of this invention is to provide a circuit for capturing and storing data bits from video scan lines that is less complex and less expensive than the apparatus heretofore known.

A further object of this invention is to provide a recording technique for all dot positions of a video display which is adaptable for use with a variety of matrix printers for the recording function.

Yet another object of this invention is to provide video copier apparatus that can capture and store data from scan line segments of identical length from each scan line and record those segments in a direction transverse to the scan lines.

A still further object of this invention is to provide video display apparatus that can count the number of scan lines and bits per line and automatically accommodate a variety of display sizes without increasing the basic hardware cost.

The foregoing objects are attained in accordance with the invention by providing microprocessor means for controlling the means for capturing scan line segments that includes counting means to select and gate the binary bits of an identical portion of each video scan line to storage or memory means. Thereafter the data of the segments are read from the memory to matrix printing means wherein each marking element of the printing means records the data from the same bit portion in each scan line segment.

The invention has several advantages. Among them is the ability of the recording apparatus to determine the number of scan lines in a display and the number of dots in each scan line during an initial setup routine by the microprocessor. The recording device adapts to a wide range of sizes and thus can be used with different displays. The device is not limited to the cathode ray tube but can be used with gas panels or other devices in which data are displayed in matrix form. The number of scan lines may be even or odd, and the print elements not required during the last scan are automatically blanked. Special attachment hardware or installation is not required since the recording device can be connected to all necessary signals found directly on the display device.

The foregoing and other objects, features and advantages of the invention will be apparent from the following more particular description of a preferred embodiment of the invention as illustrated in the accompanying drawing.

DESCRIPTION OF THE PREFERRED EMBODIMENT

Figure 1:
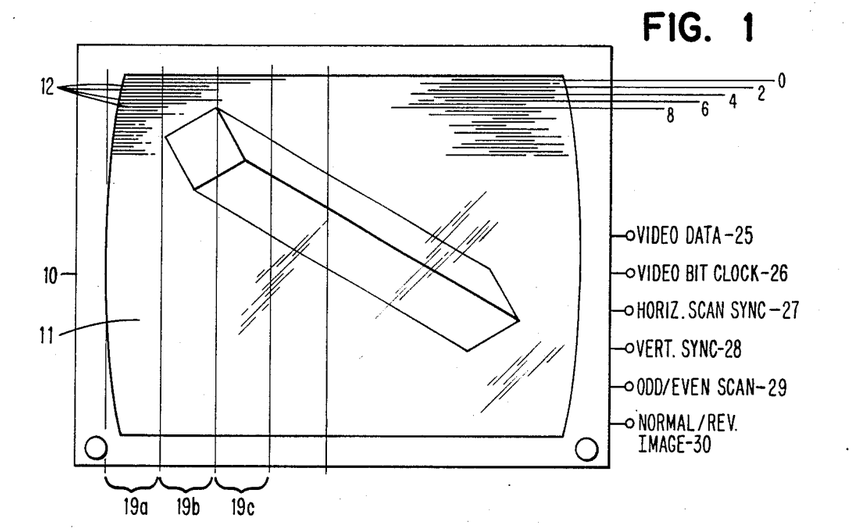
FIG. 1 is a diagram illustrating scan lines and their segments of a video frame to be recorded by the apparatus constructed in accordance with the invention.

Referring to FIG. 1, there is shown a conventional cathode ray tube display terminal 10 on the face of which is exhibited a frame of data 11. The data frame is comprised of a plurality of horizontal scan lines 12, indicated in phantom and numbered downwardly 0-8, as shown, typically totaling 525 lines. As the electron beam is scanned across the tube face, the beam is either blanked or unblanked at a dot location for each corresponding increment of travel. The number of dot locations or data bit positions in a scan line varies with the design of the display device but typically numbers about 800. When the beam is unblanked, a phosphorescent dot approximately 0.25 mm in diameter is visible on the tube face, and a display of characters or figures is composed of a plurality of dots appearing at predetermined locations. A data frame is composed of interlaced scan lines, that is, even lines zero, two, four, etc. are first generated and then the odd lines of one, three, five, etc. are generated. Since the persistance of the phosphorescence is of short duration, a displayed frame of data is repetitively regenerated and usually occurs 60 times per second.

Figure 2:
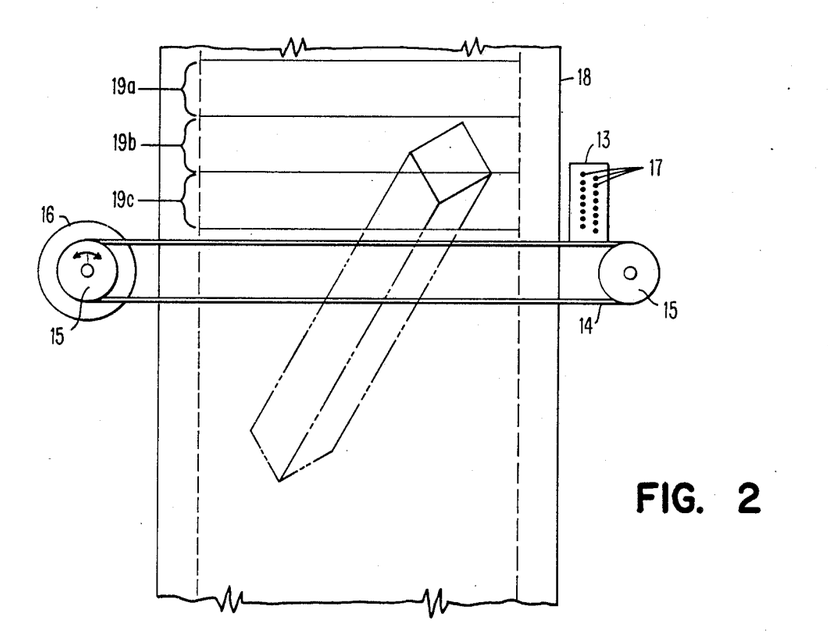
FIG. 2 is a diagram of the video frame of FIG. 1 as it appears when recorded by means of the invention.

When a "hard" or printed copy of a data frame is required, such as shown in FIG. 2, it is produced in accordance with the invention by controlling a matrix printer to duplicate the binary dots viewed on the screen. The printer is only schematically shown as a print head 13 reciprocable along a print line by belt 14 on pulleys 15 driven by motor 16. The print head has selectively energizable print wires or electrodes 17 for recording on paper 18. Electrode arrangement is two vertical rows offset with respect to each other and spaced two dot positions apart along the print line. The print head of the printer in this description is intended to be of the boustrophedonic or bi-directional type having sixteen electrodes requiring two 8-bit bytes of data for each columnar print position.

Then on each sweep of the print head sixteen rows of dots are recorded. The matrix printer described is of the type for recording on metalized paper but may be of any other type, such as impact or thermal, and may differ in number of electrodes and print in only one direction.

In this invention, data for electrodes 17 are obtained by capturing from the video information cable to the display terminal 10 an identical segment of each scan line 12. Each segment includes one data bit for each electrode thus requiring, in the illustrated example, segments of sixteen bit length. Binary data are assumed in this example in which a data bit is either present or not and there is no gray scale. As each segment of two 8-bit bytes is captured, it is stored for subsequent readout to the printer. The succession of segment pluralities are indicated by bands 19a, 19b, and 19c of the frame exhibited in FIG. 1. When the data are supplied to the print head as it moves transversely of the paper 18, the bytes of data are transmitted to the electrodes in columnar succession so that the bands of segments are duplicated but displaced 90° with respect to the original frame. Thus, the upper left hand corner in the frame now becomes the upper right hand corner in the reproduced copy.

Figure 3:
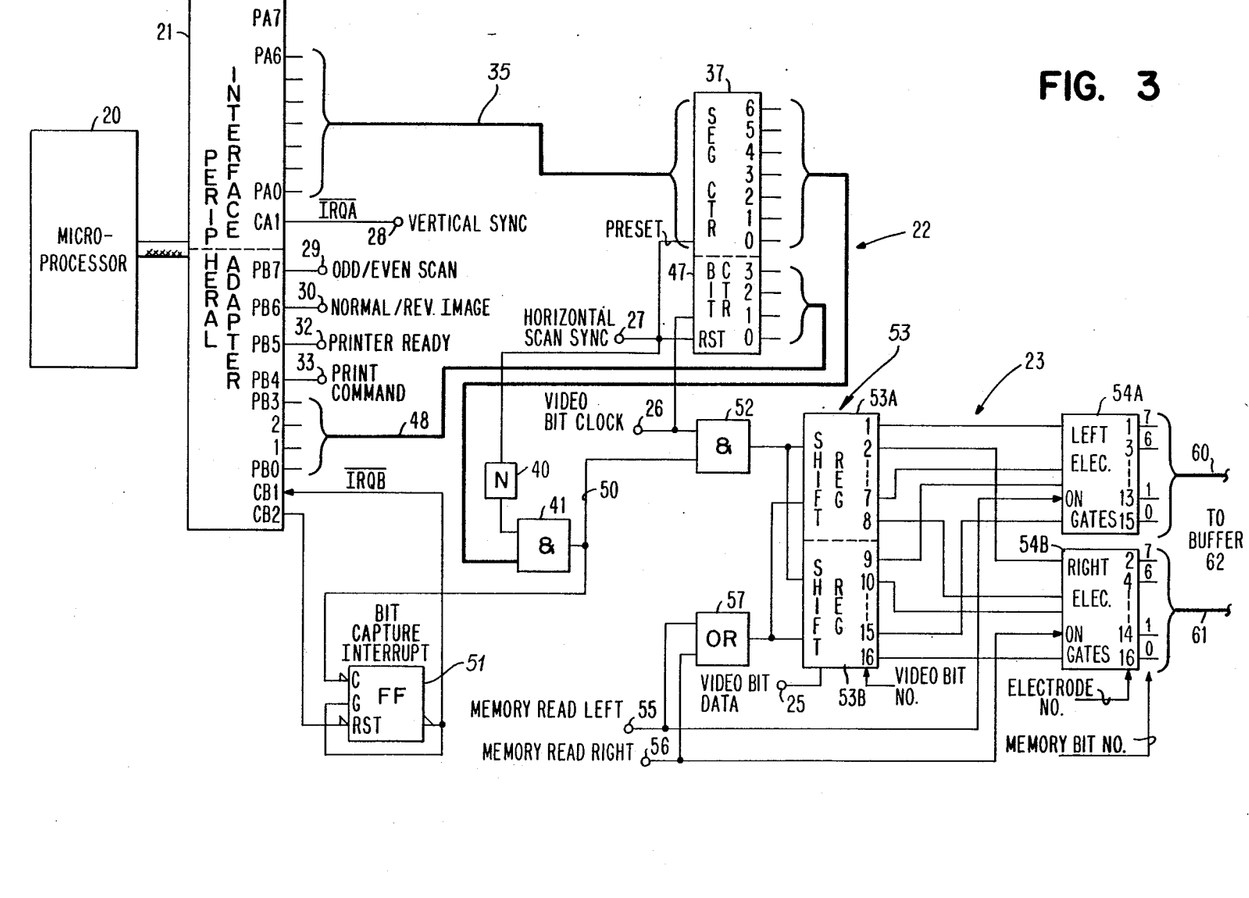
FIG. 3 is a schematic diagram of a circuit constructed in accordance with the invention for capturing data from the scan lines of a video frame.

A circuit for selecting the bits of each scan line segment is shown in FIG. 3 and comprises generally a microprocessor 20, a peripheral interface adapter (PIA) 21, a data bit capture circuit 22 and a portion of a data storage circuit 23. External connections to the video display terminal, (shown also in FIG. 1) from which a frame is to be recorded, are the video bit data signal 25, video bit clock 26, horizontal scan synchronization (sync) signal 27, vertical sychronization (sync) signal 28 and odd/even scan signal 29. An optional feature is the capability of reverse image printing with signal 30. These signals are commonly available on commercial video display devices and no further description is believed necessary. Control signal connections to the printer are printer ready 32 and print command 33 in addition to the data bit signals to the print electrodes when recording.

Microprocessor 20 may be any of several commercially available devices, either 8 bit or 16 bit capacity. An 8 bit device is described here, such as model M68A00 from the Motorola Corporation. It operates in conjunction with PIA 21, as shown, that is also commercially available such as model M6821, from the Motorola Corporation. Also included with the microprocessor system but not shown are a read-only memory and random access memory.

Terminals PA0-PA6 of PIA 21 are each connected by wires in bus 35 to corresponding stages 0-6 in binary segment counter 37. This enables a count to be read into counter 37 from microprocessor 20 via PIA 21. Output terminals of counter 37 are connected to a seven input AND gate 41 that is supplied with a conditioning signal from inverter 40 from horizontal scan sync signal 27. A second four-stage binary counter, designated bit counter 47, is decremented by the video bit clock at input 26 and rolls over through zero every sixteen bits. The output of bit counter 47 can be read into the microprocessor through the PIA 21 at terminals PB0-PB3 along bi-directional bus 48 when necessary. The bit counter 47 is reset by each horizontal scan sync signal 27 and, as it passes through zero, is operable to decrement segment counter 37 by one. Counter 37 requires the horizontal scan sync to preset that counter with the value from PIA 21. The operation of these two counters will be described in more detail hereinafter.

When all stages of counter 37 are indicating zero, gate 41, conditioned by the absence of the horizontal scan sync signal, provides an output on line 50 which is connected to a bit capture interrupt flip-flop 51 and a gate 52. Flip-flop 51 is held reset by a signal on line CB2 from PIA 21 until near the bit capture time when the reset is removed. Thus a signal on line 50 from gate 41 is operable to set flip-flop 51 on removing the signal from terminal CB1 at the PIA. This indicates the presence of a "window" permitting capture of data bits from a scan line segment.

Gate 52, being conditioned by the output from gate 41, allows video bit clock pulses at terminal 26 to propagate video bit data at terminal 25 through sections A and B of shift register 53. The capacity of the shift register is sixteen bits as is that of bit counter 47 so that when bit counter 47 reaches zero after the 16th bit, segment counter 37 is decremented removing the signal from gate 41 on line 50 to block gate 52. Thus, for one scan line a segment of sixteen binary bits has been captured in the shift register stages.

As seen in FIG. 2, the recording head electrodes are in two parallel rows of eight electrodes each and offset with respect to each other. The electrodes are designated the left bank and right bank electrodes and are spaced two printing dot positions apart. Because of this, the data in shift register 53 (FIG. 3) must be divided into two eight bit bytes prior to storage in memory. The bytes for left and right electrode banks are thus divided in FIG. 3 by connection to two corresponding appropriate tri-state gate banks 54 A and B. It will be seen that the odd numbered stages in the shift register 53 A and B are connected to appropriate gates for the left electrodes and that the even numbered stages of the shift register are connected to a group of eight gates for the right hand electrodes. When transfer of the bit data through the gates is to occur, a memory read left or memory read right signal is applied at terminals 55 and 56. Each of these signals appears from OR circuit 57 to produce readout from the shift register 53 A or B. The outputs from gates 54 A and B appear as inputs along buses 60, 61 to print buffer 62 in FIG. 4.

Figure 4:
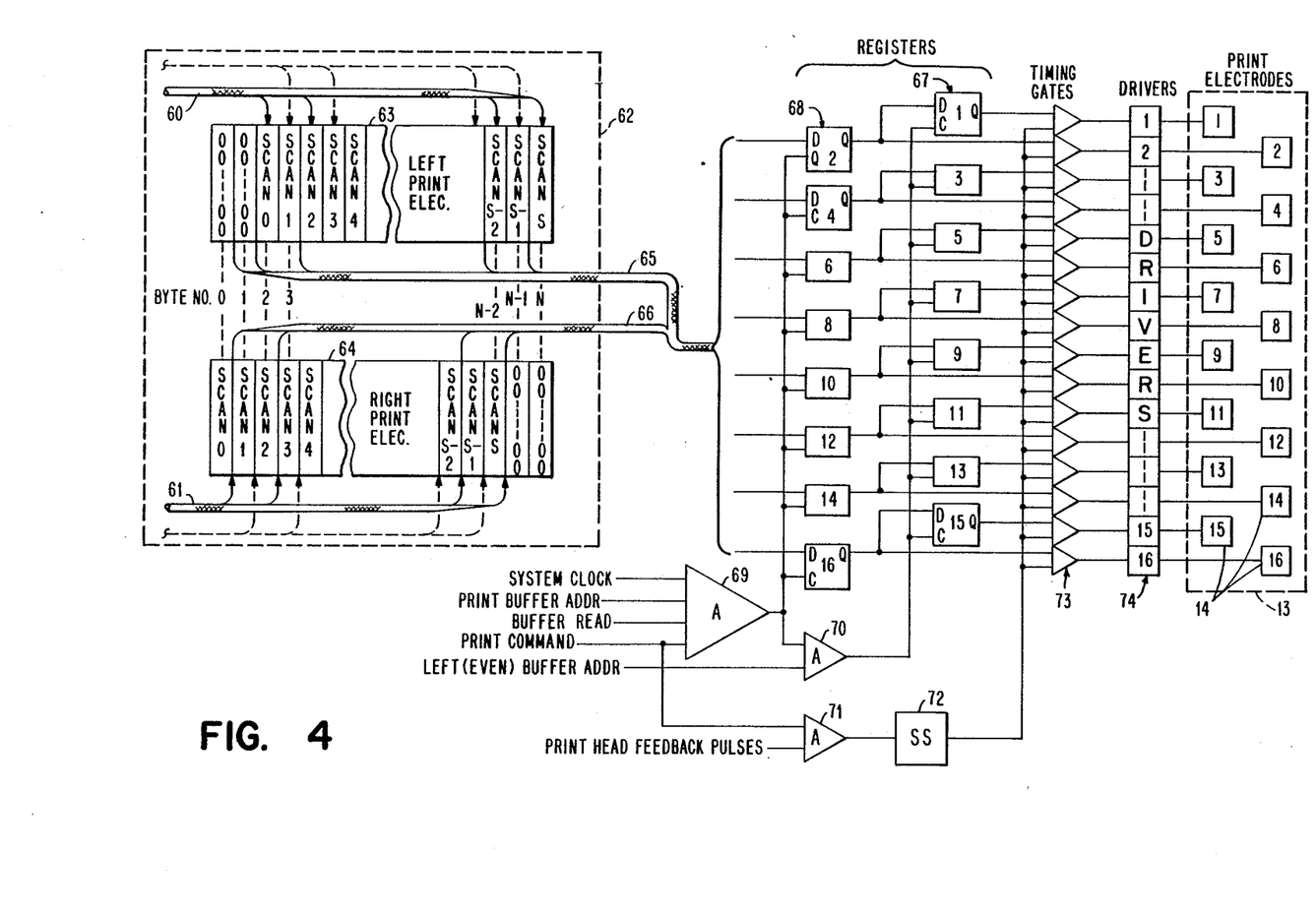
FIG. 4 is a schematic diagram of the bit storage and handling circuit for printing the data captured by the circuit in FIG. 3.

The manner in which the segment data obtained from the scan lines is stored and subsequently presented to the recording electrodes of the print head is illustrated in FIG. 4. The byte for the eight left electrodes is presented on bus 60 while the byte for the right electrodes is presented on bus 61. These buses are connected to two banks of storage locations 63 and 64 in memory 62. As the 8 bit bytes are gated into memory, they are sent to addresses that are not sequential in storage since the data are not captured in sequence for each scan line, but alternately for either even or odd scan lines. Considering the first segment of 16 bits for scan line 0, the first byte for the right electrodes is placed in a preassigned storage location such as that designated scan 0 in bank 64; the corresponding byte for the left electrodes is placed in storage location scan 0 in bank 63. This location is selected so that it will be read out two address times later when the data are to be recorded by the printer.

This displacement is necessary to compensate for the separation of the left and right electrodes as they traverse the recording medium. Since the left electrodes are two bit times behind the right electrodes in a left-to-right recording traversal, data supplied to the left electrodes must be blank. Accordingly the scan line data indicated by the various scan designations in storage banks 63 and 64 are offset by two addresses. Similarly, for recording in the opposite direction, provision for the offset is made at the opposite end of the storage banks. Thus in the first two addresses of storage bank 63 and in the last two addresses of storage bank 64 zeros are placed as data to insure that those corresponding electrodes do not print when the storage address for the 16 bits is accessed.

Readout occurs schematically along buses 65 and 66 to banks of registers 67 and 68. Each bit storage cell in the bank of registers comprises a flip-flop bearing a number corresponding to the print electrode number at print head 13. The flip-flops in the registers are set under the control of several printing system signals at gate 69, and include the clock signal, the signal indicating the print buffer 62 has been addressed, a buffer read signal and the print command. When these signals are coincident the first register bank is gated to allow the data from byte 0 of storage bank 63 to appropriately set the flip-flops. However, since the first of the two print buffer read cycles is from an even memory address for the left electrodes, gate 70 is also fully conditioned and its output in turn gates the flip-flops of register bank 67.

The data for the first 8 bit byte is stored in the flip-flops of both registers 67 and 68. However, the buffer address for the right print electrodes for scan zero is then energized and gated on bus 66 and appropriately sets the flip-flops in register 68. Gates 70 have in the meantime been closed by the absence of the left buffer address signal. Upon the occurrence of the print head feedback pulse, typically generated in printers for each column of recorded dots, this signal is effective in conjunction with the print command at gate 71 to energize single shot 72 which in turn conditions a respective AND gate 73 for each of the register flip-flops. The stored register signals then cause drivers 74 to energize a respective one of the print electrodes 1-16. After the memory has been completely read out and recorded during a single sweep of the print head, the recording medium is indexed and the next segment of the scan lines is then captured and recorded for printing in the opposite direction.

The system for capturing data segments from the display frame needs to know the number of bits or dots per scan line and the number of scan lines per frame for a particular display device in order to define the frame limits for the recording medium. This information is obtained when the display is powered up. The number of dots per scan line is calculated by counting the number of whole sixteen bits segments plus remainder for the last segment.

Thereafter, the number of scan lines is detected by counting the number of either odd or even scans and adding to that the number of the opposite scans. Actually, the scans of each type are halved and the remainder retained to form four counts to be used when actually capturing frame data. When this information is obtained, bit capture of the data can then occur. The manner of obtaining the dot and scan line counts will be only briefly described here and a more detailed description given below with regard to the data flow.

The number of sixteen bit segments in a scan line is determined by using the standard binary seek routine in which a trial solution is sought half-way between two limits. In this instance, the first trial value of 63 is set in counter 37 of FIG. 3 by averaging the minimum (0) and maximum (127) values possible at terminals PA0-PA6 of the PIA 21. When this value is set at the next Horizontal Scan Sync at terminal 27, each video bit clock pulse at terminal 26 decrements bit counter 47, and each roll over through zero (or sixteen bits) will decrement counter 37 by one. Assuming 800 bits in a scan line as an example, 50 segments will be required; however, to signify the termination of a line, the state of flip-flop 51 must be altered by a signal of zero output from counter 37 through gate 41. In order to accommodate at times a partial segment as the last segment, the ultimate segment count must be 49 (zero is a valid segment count) plus any extra bits. It will be seen from this requirement that counter 37 with its value 63 will not reach zero. Therefore, an overriding delay is set to change the maximum count value from 127 to 63. The next Vertical Sync then places the value 31 in counter 37 as the average of 63 and zero. Since there are 50 segments, counter 37 decrements to 0 and gate 41 changes the state of flip-flop 51 to produce an interrupt at terminal CB1 of PIA 21. This causes any count in bit counter 47 to be stored and blocks further interrupts until after the next Vertical Sync signal; delay is set to a negative value. Thereafter, the minimum value is raised to 32 or 1 greater than the value of the count set in counter 37. If an interrupt occurs, minimum values are raised and, if not, maximum values are lowered. Successive trials with the averages of minimum and maximum values will set counter 37 at values of 47, 55, 51, 49, 50 and finally 49. Binary seek routine is then terminated and the count remaining in bit counter 47 is saved in memory. In the particular example the extra dots are zero.

Scan lines are counted by counting both odd and even lines. Either group of lines can be counted first. Segment counter 37 is set to zero as though capturing the first bit segment of each line. As each Horizontal Scan Sync sets segment counter 37 to zero, flip-flop 51 provides a state change that is sensed at CB1 at PIA 21 and counted. These state changes are counted and stored until a change occurs in ODD/EVEN Scan at PB7 PIA 21. The accumulated count is then divided by 2 and the values, one with the remainder, if any, are stored. The counting, dividing and storing are then repeated for the opposite scan field. These two counts provide a scan line count for further control. The reason for dividing each count is that during bit capture of data, the storing of captured data prevents the system from getting the segment from the next scan line due to lack of time. Thus, two scans are required for even lines and two for odd lines. Lines 0, 4, 8, etc., and 2, 6, 10, etc., will be captured and then lines 1, 5, 9, etc., and 3, 7, 11, etc., will be captured if the even lines happen to be sensed first. The capture of frame data can now take place.

A segment of sixteen bits is captured by setting a count of 0 in counter 37 and in counter 47 at the occurance of an ODD/EVEN Scan signal, a Vertical Sync and a Horizontal Scan Sync. These signals indicate that a new scan field is to be regenerated. The resetting of the counters 37 and 47 to zero turns on gate 52 and, with memory read signals on, for the next sixteen video clock bits gate 52 opens shift register 53A and 53B to store sixteen video data bits. Segment counter 37 is then decremented, being no longer zero, so that gates 41 and 52 are blocked. The shift register data are then sorted by gates 54A and 54B as to odd and even bits for the print electrodes and stored for later use.

The next Horizontal Scan Sync again sets zeros in counters 37 and 47 and the first sixteen bits for the next scan line are captured and stored. As stated above, segments of alternate odd and alternate even scan lines are captured during each Odd/Even Scan field. Thus, four scan fields are required to get the first sixteen bits of each scan line of a frame.

The second segment in each scan line is captured by setting counter 37 to one and bit counter 47 to zero when the Horizontal Scan Sync occurs. This process requires that the first sixteen bits be bypassed until counter 37 reaches zero when gates 41 and 52 will be opened. The procedure is repeated for all scan lines with segment counter set to one for each line as data are captured. By this technique the second segments of the scan lines are captured and stored. It will be seen that counter 37 has to be preset to successively higher counts for capturing different bands across the video frame. After each segment series, 0, 1, 2, etc., has been captured, printing of the sixteen bit band occurs as seen in FIG. 2.

Microprocessor Data Flow

The programming terminology used herein is that of the Motorola 6800 microprocessor, also called "processor", and 6821 peripheral interface adapter but another system having equivalent attributes with sufficient processing speed would be satisfactory. The basic understanding of multiple level interrupt service programming is assumed, since it is common knowledge.

Figure 5:
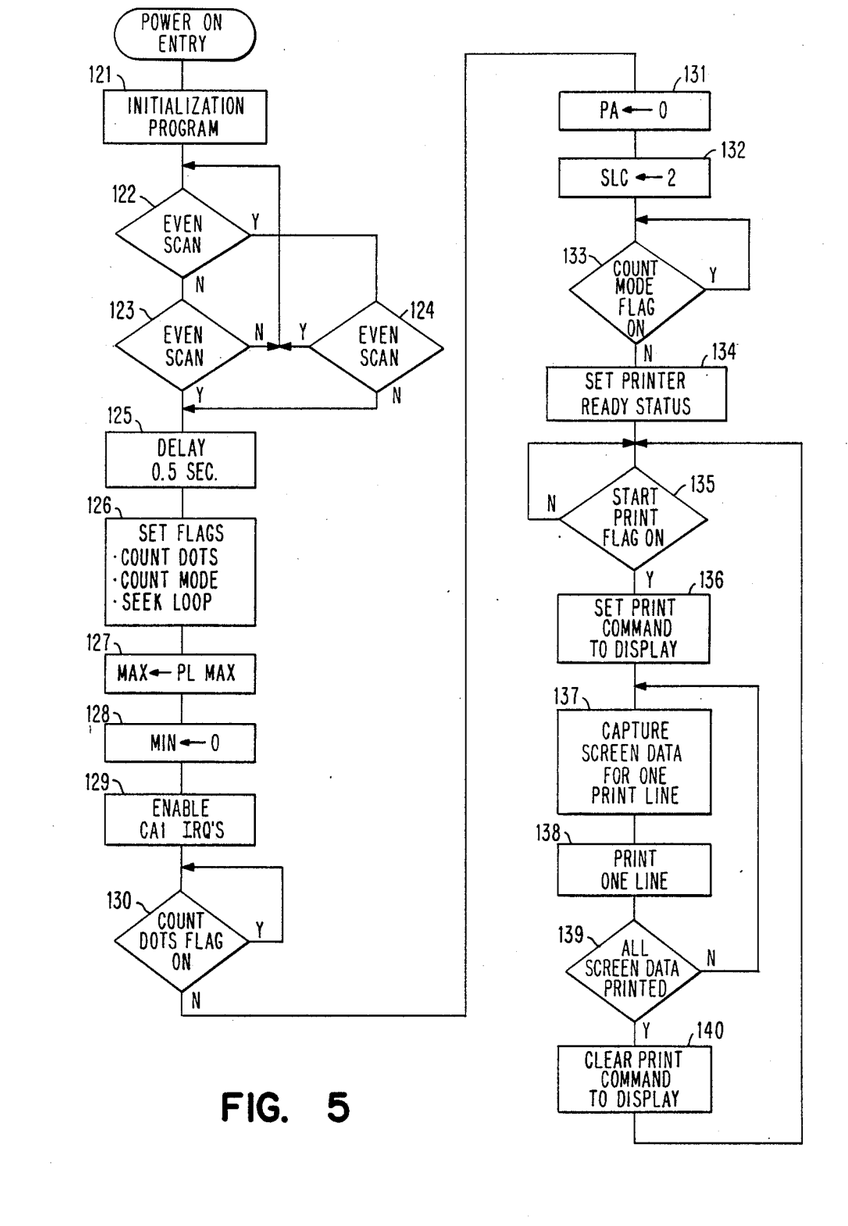
FIGS. 5-11 are data flow diagrams showing the steps which can be used to control the capture and recording of video data.

Any time the processor is not executing code in any interrupt service routine, it will be executing code in the Master Control Program in FIG. 5. The flowchart is the master code set which steers interrupts through particular interactive code sets in other routines by setting flags and key parameters to initialized states. Those parts of FIG. 5 which are not pertinent to this disclosure are not described in detail. The processor will vector to start execution at function block 141 in FIG. 6 when the $\overline{IRQA}$ line of PIA 21 is activated according to the PIA rules for setup of CA1 and CA2; this interrupt can occur any time the processor interrupt flag is not masked OFF. The NON-NMI IRQ is the code entry point for interrupts that can be masked by the program. The processor will vector to start execution at function block 173 in FIG. 7 when the $\overline{IRQB}$ line of PIA 21 is activated according to the PIA rules for setup of CB1 and CB2; this non-maskable interrupt (NMI) to the processor will always be honored immediately by definition, so it has the highest priority of any interrupt.

Block 121 in FIG. 5 handles all code bring-up chores such as checking and initialization of working registers as specified for a given machine, including PIA 21 (FIG. 3). Blocks 122–124 provide a means of determining that the attached display device has power ON by looping until the Odd/Even Scan line is seen to change state. Thus, no discrete power ON signal is required. Since the display power may be just coming on, and signals may not be stable, delay 125 is inserted to give assurance of stable display signals; the time lost if the display were already ON is negligible.

The number of dots per scan line is then counted. Blocks 126–128 set up the appropriate interrupt service flags and constants to allow those routines to count the number of dots per scan. Block 129 allows interrupts CA1 IRQ to occur and block 130 waits for those routines to complete the task. Block 126 says to count, be it dots or scans; more specifically, dots are to be counted and then the processor is to loop in the binary seek routine until a particular result is obtained.

Figure 6:
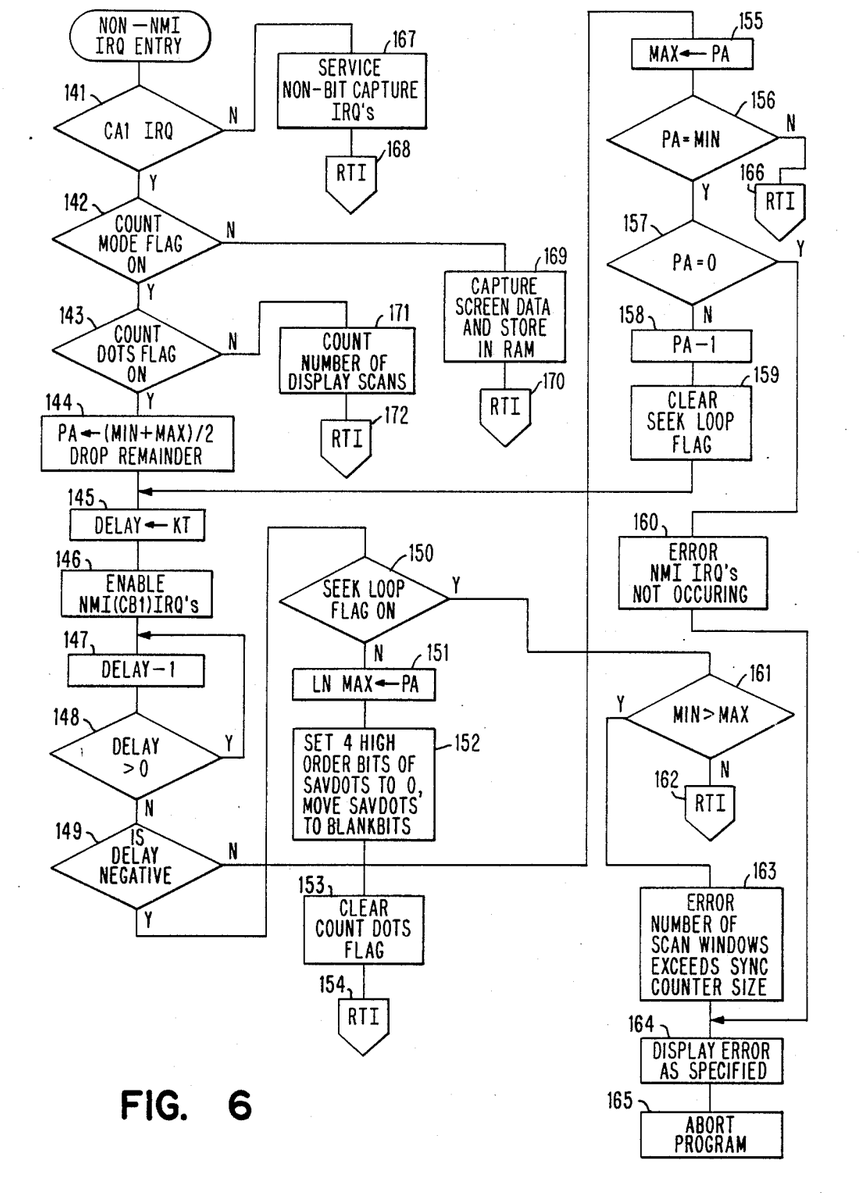

Block 127 sets the initial maximum value of the binary seek routine to Print Line maximum (PL MAX) which is given by $(2^n - 1)$; n is the number of bits preset from PIA 21 into segment counter 37 (FIG. 3), or seven in the particular case, for a PL MAX of 127. PL MAX is the maximum number of bit capture windows, thus printed lines or bands, permitted by a particular implementation. The maximum number of dots per scan that can be accepted is then DPCW $\times$ PL MAX where DPCW is the dots per capture window (16 in this particular case). Thus the particular implementation has a maximum of 2032 dots per scan. Block 128 sets the initial minimum value of the binary seek routine to zero. Preparations are now complete to count the dots per scan so blocks 129 and 130 occur as described. The next time the Odd/Even scan line 29 (FIG. 3) changes state, a non-nonmaskable interrupt request (NON-NMI IRQ) is signaled via a vertical sync signal at PIA terminal CA1, and program execution ceases in block 130 and begins at block 141 (FIG. 6). Either hardware can create a vertical sync pulse each time the Odd/Even line changes state or the Odd/Even scan line can be wired to CA1 and programming used to alternately change the IRQ sense status of CA1 to track the alternating state changes of the Odd/Even scan line. The first is chosen here to simplify explanation of the NON-NMI interrupt service routines.

When the Count Dots programming is complete that flag is cleared and the program advances to block 131. The PA0–PA6 terminals of PIA 21 (FIG. 3) are set to zero which readies that data for setting segment counter 37 (FIG. 3) at the next Horizontal Scan Sync. This will cause the capture window to open at the first set of 16 dots on each display scan and set flip-flop 51 to its opposite state.

To count the number of scans, it is necessary to synchronize the program to the display scan start and count across two successive field scans (one Odd and one Even in either order), then stop counting. This requires three CA1 (Vertical Sync) interrupts so SLC (Scan Loop Count) is set to 2 in block 132 and the program drops into an interlock loop at block 133; the count flag is still ON from block 126. The interrupt routine will clear this flag when SLC becomes negative after three vertical syncs and counting is complete; the program then sets Printer Ready status in block 134. That signal appears at the output of PIA 21 at terminal PB5 and can be used as required in the printer and display.

The program then steps to block 135 and loops there until it is told to print. Although not pertinent here, one could wire a "PRINT" switch to PIA 21 at CA2. This would cause a NON-NMI IRQ which would then cause execution of code in blocks 141, 167, and 168 (FIG. 6), which would set the Start Print flag ON. The program then steps to block 136 which interlocks the display via Print Command 33 at PB4 on PIA 21 (FIG. 3) to prevent changing the display screen data until printing is complete.

Block 137 causes one print line of screen data to be captured in random access memory and block 138 causes printing. Until the correct number of lines has been printed (as determined by the Count Dots program), block 139 will loop back to block 137. When printing is done, step 140 is entered so the Start Print flag is turned OFF. The display interlock at PB4 of PIA 21 is released and the control program reverts to looping at block 135 until another "PRINT" signal sets the Start Print flag ON.

Figure 7:
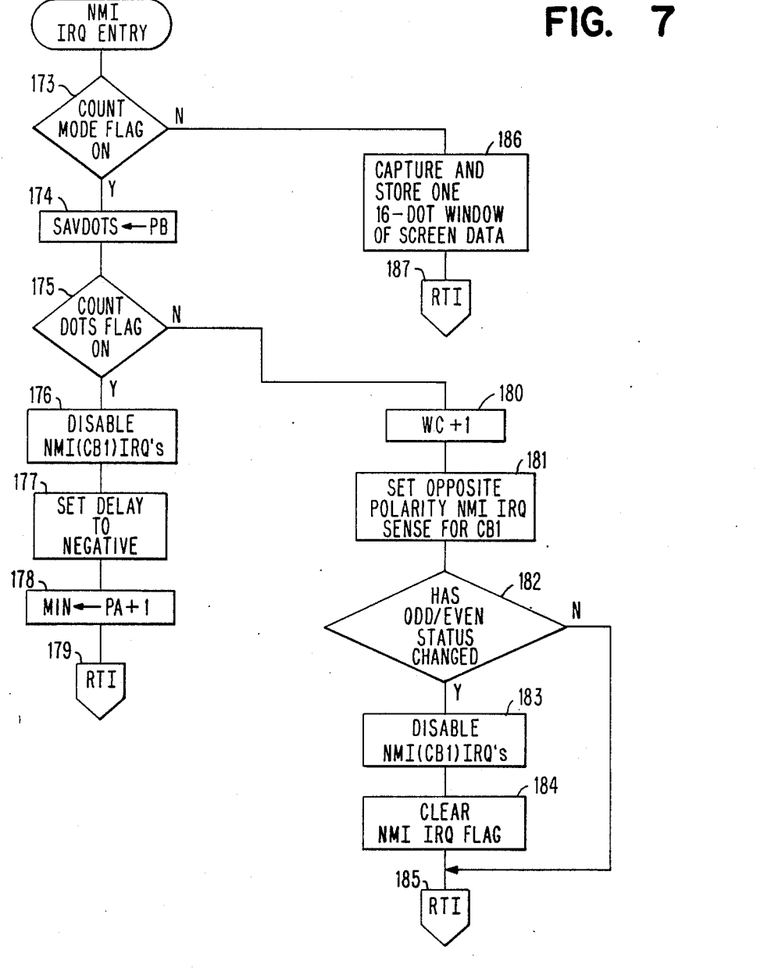

FIG. 5 and the previous description pertain to the overall printer display control program. Flowcharts in FIGS. 6 and 7 are entered when interrupts of the assigned sense occur on CA1 and CB1 lines, respectively of PIA 21 (FIG. 3). FIG. 6 is entered once per display field (Odd or Even) when CA1 is enabled, as in block 129 of FIG. 5, and FIG. 7 is entered each time flip-flop 51 changes to the assigned state when CB1 is enabled, as in block 146 of FIG. 6.

Counting Dots Per Scan Line

The following description explains how the program determines (a) the number of capture windows required to capture the data on any screen scan and (b) the number of scan dots in the last capture window so that an appropriate number of blank bits can be inserted into memory on the last print line. The printer must know the values for (a) and (b) so they are calculated rather than detected as the discrete number of dots per scan. The total dots per scan is obtainable with the equation (DPCW×LN MAX)+(dots in last capture window) where LN MAX=print lines (PL−1).

The next time a pulse appears at CA1 of the PIA 21 after execution of step 129, and each time thereafter until the CA1 interrupts are disabled, the program will begin execution at block 141 in FIG. 6 provided it is not executing any block in FIG. 7 (non-interruptable by definition).

The CA1 level sense will have been enabled with the polarity of the Vertical Sync signal provided. With control execution down to block 130 in FIG. 5, CA1 interrupts pass through 141, 142 and 143 and the microprocessor now begins to calculate the value of LN MAX. LN MAX will be the value placed in PA0–PA6 of PIA (FIG. 3) and thus preset into segment counter 37 to gather display data for the last line required for the attached display device.

This calculation is done by using a standard binary seek technique of a trial one-half way between two limits called MIN and MAX. In this case, the trial results in either setting the next value of MIN at (PA+1) or the next value of MAX at PA. (The term PA designates the binary count value at terminals PA0–PA6 at PIA 21 in FIG. 3.)

An execution set is explained using, for example, 800 dots per scan with 16 dots per capture window. The calculated result will yield the number of print lines (PL) as 50 from 800÷16, LN MAX=49 with a full count of 16 dots in the last window. Block 144 chooses PA=0+127÷2=63 (available to preset counter 37). Block 145 loads a delay constant KT which is used in blocks 146 and 148. Block 146 resets flip-flop 51 (FIG. 3) in bit follow mode then simultaneously removes the FF reset and enables CB1 to accept positive edge IRQ's.

The delay begins execution in the loop formed by blocks 147 and 148; the maximum time for this delay is not important as long as it exceeds the longest time for a single scan of any display to be used. The value of KT in block 145 is chosen by dividing the desired total delay by the time to execute blocks 147 and 148 by the chosen microprocessor and system clock.

Since the PA, segment counter 37 preset value, is chosen as 63 and the example can have only 50 capture windows, counter 37 will not reach zero; no capture window and thus no CB1 IRQ will occur. When the delay value KT decrements to zero, the path is through blocks 148 and 149 to 155, which changes the MAX from 127 to 63. Since MIN=0, the path is through blocks 156 and 166 which is a Return From Interrupt (RTI). The program then returns to looping at Block 130 in FIG. 5 until the next CA1 IRQ when the Odd-/Even scan changes state and places a pulse on the Vertical Sync line. It will be appreciated that this process could be done without the wait for the next CA1 interrupt. Since that is just a programming technique and the extra approximately 80 ms saved is negligible with power having been just turned ON, the simpler method is chosen.

At next CA1 IRQ time, through blocks 141–143, step 144 then choses PA=31 from MIN and MAX of 0 and 63. Blocks 145–148 begin execution but since the maximum value of PA which can allow a capture window is 49 (for 50 capture windows, zero is valid), an NMI IRQ will occur with PA=31 before the delay can reach zero in block 148. The program then enters blocks 173 and 174 in FIG. 7 where the value of bit counter 47 (FIG. 3) is read and saved in SAVDOTS in case it is needed; this must be very high speed execution so this technique is used to avoid a decision step in the path which adds execution time. By means of blocks 175 and 176, the program disables further CB1 IRQ signals until after the next CA1 IRQ when block 146 (FIG. 6) will enable them again. Block 177 sets the delay, assoicated with blocks 147 and 148 (FIG. 6), to a negative value; note that 147 and 148 are not executing while blocks 173 through 179 are executing.

Function block 178 now sets the binary seek MIN value to (PA+1) or 32. To know which is the last capture window, the program must determine the lowest numbered value for PA that will not result in a capture window. This is the reason the PL MAX value must be one less than the binary combinations possible in segment counter 37. It is also the reason MIN is given by (PA+1); the value PA resulted in a capture window, thus a CB1 IRQ.

After completion at block 179, the program returns to blocks 147 and 148 in FIG. 6. To be workable, 148 must read the delay from RAM so that step 177 (FIG. 7) can set the delay negative. Following the return from 179, the program passes through steps 148, 149, 150, 161 and 162 because MIN=32 and MAX=63. The program then refurns to 130 (FIG. 5) and awaits another CA1 IRQ. The third CA1 IRQ signal proceeds through 141-146 in FIG. 6 and loops at blocks 147 and 148 having set PA at 47. With 50 windows available, a CB1 IRQ occurs and the code passes through steps 173-179 (FIG. 7) having set MIN at 48. The loop at 147 and 148 is again exited through 149, 150, 161 and 162 as before. The fourth CA1 IRQ again arrives at the 147, 148 loop with PA set at 55. Thus no CB1 IRQ will occur and the program will exit through steps 149, 155, 156 and 166 having set MAX at 55. The fifth CA1 IRQ results in PA set to 51, which results in no CB1 IRQ, then waits for the delay to go to zero and exits as before with MAX now set at 51. The sixth interrupt results in PA being set to 49 and a CB1 IRQ occurs while looping in steps 147 and 148, therefore, MIN is set to 50 and the delay is set negative as on the third CA1 IRQ set; the exit again is through blocks 149, 150, 161 and 162. The seventh interrupt results in PA set to 50 but a CB1 IRQ signal will not occur because a PA value of zero is for the first window. The loop at steps 147 and 148 reverts to zero and the path is now through blocks 149 and 155-159. MAX has been set to 50, PA=MIN=50 and PA is not zero; PA is then set to 49 and the seek loop flag is cleared. The program has now determined there are 50 capture windows on one scan of the attached display because the trial for PA=49 (50 windows) resulted in an IRQ and the next trial for PA=50 (51 windows) resulted in no IRQ to CB1.

The remaining "Count Dots" task is to determine the number of dots in the last capture window. From block 159 the code path is through blocks 145 and 146 thence into the delay loop. With PA at 49, a CB1 IRQ is assured so MIN will be set to the same value, 50, and the delay is set negative. Note that while in the NMI routine the value of bit counter 47 (FIG. 3) was read in 174 as SAVDOTS. With a negative delay, the path is through blocks 149-151 for the first time because that flag was cleared in step 159.

In block 151 the value of PA, 49 in this example, represents the maximum value to be used while capturing data, then printing. When this value, called LN MAX, has been used to capture data and that data set has been printed, the basic control program, that has been looping through blocks 137-139 (FIG. 5) while printing, will then pass through step 140 and return to 135. In block 152 the 4 high-order bits of SAVDOTS are cleared. The 4 lower-order bits are the count residue of bit counter 47 (FIG. 3). In the case of 800 dots per scan with 16 dots per window, counter 47 is zero because the last window has 16 dots and the counter cycled from zero to 15 and back to zero. It can be shown, however, that the value in SAVDOTS at this time will always be the number of blank bits the microprocessor must add to the screen data captured for the last line of printing to avoid unwanted printing on that line. Since block 174 (FIG. 7) will be executed later on, step 152 moves the resultant SAVDOTS information to BLANKBITS.

The "Count Dots" program does not actually count the number of dots per scan, but rather it determines how many capture windows are required to print one frame of screen data, at one print line per capture window, and how many blank bits to put in each capture window data frame only when capturing for the last line to be printed. Inherent in this information is the number of dots per scan. After block 152 is executed, block 153 clears the flag causing the control to loop at step 130 (FIG. 5) and following step 154 the program returns to step 130 and passes to step 131.

In FIG. 6, two error conditions can be detected in the process of binarily seeking to find the number of capture windows in any scan. The routine must find the first window which results in no CB1 IRQ to detect that the previous window will really be the last valid one when printing. The binary seek bounds are set by zero and the maximum size of segment counter 37 (FIG. 3). If the above requirement cannot be reached by the seek routine without exceeding the physical boundaries, an error type at each boundary can be detected. If a CB1 IRQ cannot be obtained with (PA=0), since that represents the first possible window, it means the program is not receiving CB1 IRQ's for some reason and the printer cannot capture data. Block 157 in FIG. 6 detects this, and block 160 posts the particular error type. Block 164 displays it to an operator, if desired, and block 165 is any desired ABORT program, as specified for the machine.

On the other hand if the maximum possible value for PA (127 in the given example) still results in a CB1 IRQ, the program cannot determine how many capture windows are contained in a particular display scan. If one printed to the limits of the capture window circuitry, the output would have dropped information at the right side of the display screen. It can be seen that the binary seek routine will reach a stage, due to CB1 IRQ's each trial, when MIN is incremented equal to MAX in block 178, and block 144 then sets PA to that same value for a "NO IRQ" trial. However, an IRQ does result so MIN is then incremented to (MAX+1) in block 178 in FIG. 7 and the negative delay set in step 177, following RTI 179, will cause a path through blocks 148-150, 161, 163-165 where 163 posts this type of error.

Counting Display Scan Lines

Blocks 131 and 132 in FIG. 5 set the initial conditions required to count the number of display scan lines in appropriate fashion; the results will be used in step 137.

Figure 8:
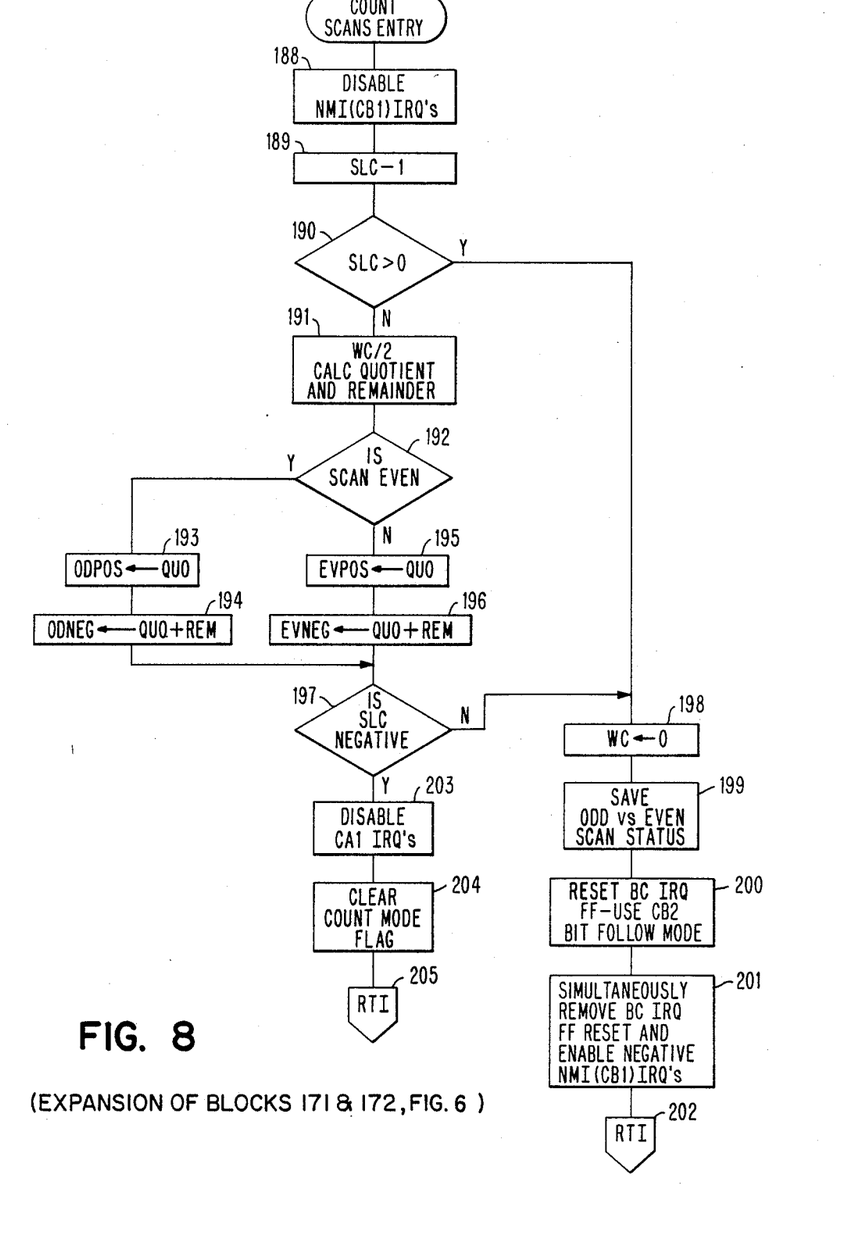

CA1 IRQ's are still enabled from step 129 before the "Count Dots" execution. When PA=0 in segment counter 37, flip-flop 51 (FIG. 3) changes state on the first capture window of each scan and SLC=2 causes termination of the "Count Scans" execution after the next three successive CA1 IRQ's, as explained earlier. The control program now drops into a loop state at step 133 because this flag is still on from step 126. At the next three CA1 IRQ's the path is through blocks 141-143, 171 and 172. FIG. 8 is the expansion of blocks 171 and 172 so these interrupt signals essentially enter block 188. When one occurs, step 188 disables CB1 IRQ's so proper synchronization of scans will occur following each Vertical Sync on CA1. Block 189 reduces SLC from 2 to 1 so the continuation is from blocks 190 to 198 where WC (a work counter) is set to zero. Step 199 saves the Odd/Even Scan status present on PB7 of PIA 21 (FIG. 3) for use in the CB1 IRQ service routine. Block 200 resets flip-flop 51 (FIG. 3) using Bit Follow Mode as defined for the CB2 output, then block 201, again as defined for CB1 and CB2 of the PIA, removes the flip-flop 51 reset while CB1 negative edge IRQ signals are enabled. Block 202 equates to block 172 in FIG. 6 so the program reverts to step 133 (FIG. 5) until the first scan produces a capture window, flip-flop 51 turns ON, and a CB1 IRQ occurs.

The code path is now through blocks 173-175 and 180 in FIG. 7 where one CB1 IRQ is counted in WC. Block 181 sets the CB1 IRQ polarity sense to its opposite polarity (the first pass here changes the original negative from block 201 to positive polarity). Since there will always be multiple scans per Odd or Even Scan field, that status has not changed after one CB1 IRQ so the path is through block 182 to 185 and a return to step 133 (FIG. 5).

Shortly thereafter the second scan will produce another capture window and flip-flop 51 will turn OFF which causes a positive edge at CB1; this results in an IRQ because step 181 just set the CB1 circuitry to sense that polarity. Again, the path will be steps 173-175, 180-182 and 185 with a return to 133 (FIG. 5). This process continues with successive scans causing flip-flop 51 to alternate ON and OFF while the resulting IRQ execution in FIG. 7 keeps counting the number of IRQ's (thus scans) in WC 180 and alternately setting the CB1 IRQ polarity sense in concert with that expected next from flip-flop 51. The process ends when step 182 finds the Odd/Even Scans level on PB7 (PIA 21) is changed from the saved status in step 199 (FIG. 8). This status changes in the display during the last screen scan having data. At this time WC contains a count of the scans that have occured since this same point one scan field ago when the first CA1 IRQ occured. Blocks 183 and 184 prevent further counting until the next scan setup is complete in FIG. 8.

A CA1 IRQ is still pending because that is what caused step 182 to drop through 183 and 184, but it can not execute until step 185 is complete because of processor priority for NMI interrupts in FIG. 7. After step 185, 188 is entered via blocks 141-143 (FIG. 6) and 171 as before, block 188 has no effect after step 183 but step 189 reduces SLC from one to zero. The path is now through block 190 and 191 where the number of scans counted by WC in step 180 is divided by two and the remainder saved.

The path through block 192 can be either way the first time. If the Odd/Even Scan level at PB7 of PIA 21 is now assumed to be indicating ODD, and, since a transition is now being serviced by FIG. 8, then the count in WC is the number of EVEN scans on the display. Therefore, step 195 will put the quotient in a location EVPOS to be used in step 137 (FIG. 5). Since flip-flop 51 will give a negative going IRQ sense on the first Odd or Even Scan, the remainder from block 191 represents an uneven number of Odd or Even scans. Block 196 adds the remainder of zero or one to the quotient and places the result in EVNEG. Note that in blocks 193-196 results are placed at a location comprised of EV or OD and POS or NEG. EV and OD refer to Even or Odd Scan types on which the scans were counted; POS and NEG refer to polarity of the CB1 IRQ used to obtain the particular count subset. At this stage of "Count Scans", SLC is zero so block 197 goes to 198 and through 202 as before. While either transition order is allowed, this example started counting on an Odd-to-Even transition. Block 199 has saved Odd status this time and block 201 has again enabled CB1 negative IRQ's.

The program again returns to step 133 in FIG. 5 until a CB1 IRQ occurs; as before, each one causes execution in FIG. 7 through blocks 173-175, 180-182 and 185 until such time as step 182 finds the Odd/Even status has changed, this time its from Odd to Even, because the first time it was from Even to Odd. Therefore, when step 182 passes through 183 and 184 to step 185, the counted number of Odd scans is in WC and no further scan interrupts can occur on CB1. Again, the change of status detected by block 182 caused a pending interrupt at CA1 so the program returns from step 185 to step 141 in FIG. 6 instead of block 133 which has no priority assigned. Step 141 passes through step 171 to 188 and 189 in FIG. 8 where SLC now becomes a negative one. The path is now through blocks 190-194 because SLC is not greater than zero and the Scan status now is Even. Therefore, the number in WC represents Odd scans so steps 193 and 194 perform functions equivalent to 195 and 196 respectively. Since SLC is negative, block 197 goes to blocks 203-205 where Vertical Syncs on CA1 are disabled, the Count Mode flag is cleared and the program returns to block 133 (FIG. 5) where it will fall through to 134. At this time the total scans have been counted in terms required by the program in block 137. The description for 137 contains the significance of the particular counts labeled EVPOS, EVNEG, ODPOS, and ODNEG.

Data Capture

The explanation of capturing data in block 137 (FIG. 5) has major elements dealing with common indexed programming techniques that take data captured in a particular window and place it in memory in an appropriate fashion for ease of dumping it to the printer. That program would vary widely with particular printer control implementations and is not germane to capturing the data one window at a time until a full print line is captured.

Once the control program drops through block 133 in FIG. 5, all flags set in block 126 have been cleared and Printer Ready is set at block 134. The only operative path in FIG. 6 for capturing data is blocks 141, 142, 169 and 170. In FIG. 7 the only path is steps 173, 186 and 187 for handling capture window interrupts at CB1.

A print line of data is captured in the following manner and block 137 is expanded in FIG. 9. To start with print line number 1, PA is set to zero in block 206 which enables the first set of sixteen dots in each scan line to be the capture window. Data can only be captured and stored every other display scan so that two passes must be made through Even scans and two passes through Odd scans. Thus, block 207 sets the Scan Loop Counter to 4 so capture completion can be determined. With four successive Odd/Even scan fields required for capture, block 208 sets flags to keep track of which Even and which Odd scans were captured the first time so the second capture pass will pick up the remaining scans. Block 209 allows the interrupt process to start in the manner of step 129 (FIG. 5) and block 210 will hold the control program interlocked until one print line of data has been captured; the control program then continues through block 138 (FIG. 5) as previously described.

Figures 9, 10:
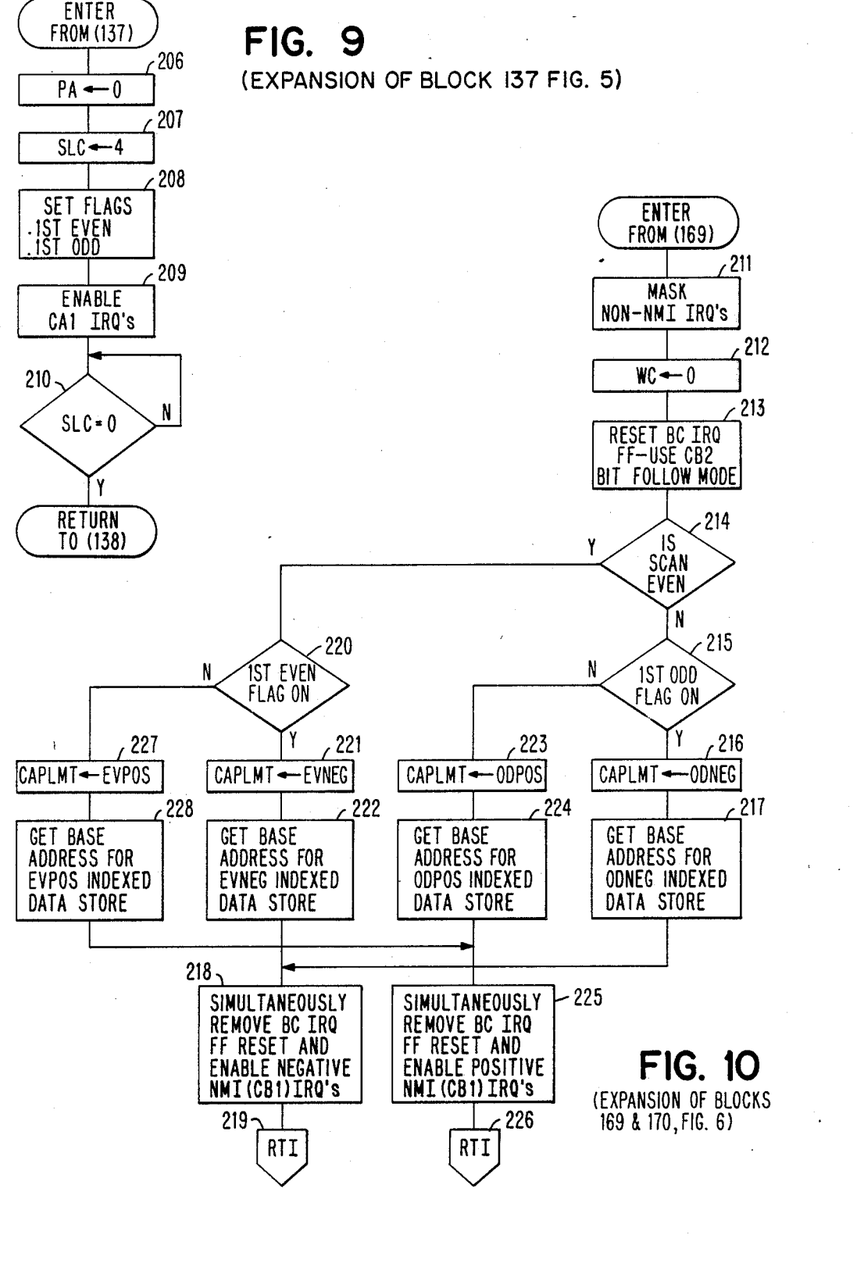

After block 209 in FIG. 9 is executed, each CA1 IRQ will enter block 211 in FIG. 10 via 141, 142 and 169 (FIG. 6). Block 211 prevents any other possible system interrupts that would pass through steps 146, 167 and 168 from disturbing bit capture during a particular scan capture field (1 of 4 fields to capture one print line of data). These interrupts remain pending but MASKING allows the microprocessor to ignore them during this period when it must operate in concert with the attached display scanning system. Block 212 of FIG. 10 sets the Work Counter WC to zero; it will count the number of scans captured in a scan capture field. Block 213 resets the BC IRQ flip-flop 51 (FIG. 3) as described for block 200 (FIG. 8).

The data capture process can start on either an Odd or Even Scan field boundary, whichever comes first following execution of step 209. The display scans are assumed to be numbered starting with zero where zero corresponds with the first display scan that will be printed. This capture example assumes the first recognized CA1 IRQ came as a result of an Even-to-Odd Scan field transition. As previously described, capture occurs on alternate scans and flip-flop 51 turns ON with the first Odd or Even scan then alternates thereafter. It can be seen that negative going flip-flop transitions will be presented to CB1 input of PIA 21 (FIG. 3) on the following scans: 0, 4, 8, etc., 1, 5, 9, etc. In a like manner, positive going flip-flop transitions will be presented to CB1 on scans 2, 6, 10, etc., and 3, 7, 11, etc. The number of elements in each of these four series was determined by the "Count Scans" programs and stored in the registers respectively labeled EVNEG, ODNEG, EVPOS and ODPOS.

Since execution of data is just beginning with an assumed Even-to-Odd scan field, the path from block 213 is 214–216 in FIG. 10 where the work register CAPLMT (for capture limit is set to the number of Odd negative scans in the 1, 5, 9 . . . series. Block 217 places in the microporcessor Index Register the memory address where the first set of captured data will be stored; this is specifically for Scan 1. Block 218 then allows actual capturing to start as described for block 201.

The first negative transition of flip-flop 51 (FIG. 3) gives a CB1 IRQ indicating Scan 1 data has been captured and is available in shift registers 53A and B (FIG. 3). Each CB1 IRQ path now is blocks 173 and 186 (FIG. 7) and 229 in FIG. 11 where the data in the shift register are stored in the memory location specified by the index register. Block 230 then alters the microprocessor index register to point to the address in memory where the next captured data will be stored; at this stage that data will come from Scan 5.

Block 231 increments WC to remember that data from one ODNEG scan has been captured. Block 232 will indicate that data from each ODNEG scan has not been captured because WC is one and CAPLMT is that given by blocks 196 (FIG. 8) and 216 (FIG. 10) so the RTI in block 233 is executed. This will occur before the next negative flip-flop ON transition when Scan 5 begins. The program now returns to step 210 in FIG. 9 to await the CB1 IRQ at the start of Scan 5.

Flip-flop 51 (FIG. 3) will turn ON and cause a CB1 IRQ for all ODNEG scans and the program stores the captured data of each scan then returns. The path each ttime is blocks 229–233 (FIG. 11) until WC indicates that the series is complete at step 232. Further CB1 IRQ's are disabled at step 234 and NON-NMI IRQ's are allowed at step 235 so the processor can "see" the pending CA1 IRQ at block 141 (FIG. 6). While an interrupt other than CA1 might also be pending, the program at step 141 gives CA1 a higher priority, it will still be ignored. The CA1 IRQ itself is, of course, ignored by the processor until it has executed an RTI in FIG. 11 since the inherent top priority is always NMI service.

One of the four scan fields has now been captured and this is noted by reducing SLC from 4 to 3 in block 236; block 237 then proceeds through 238 to 239 where the flag indicating the first Odd series data sets have been captured and step 240 returns.

A CA1 IRQ is now pending so that path is through blocks 211–214 to 220 and 221 in FIG. 10, where the number of scans 0, 4, 8, etc. is placed in CAPLMT. Block 222 gets the proper index address in the manner of step 217, then steps 218 and 219 allow CB1 IRQ signals, as before. From this point the data flow of FIG. 11 captures and stores data in Even scans 0, 4, 8, etc. in manner like that for Odd scans 1, 5, 9, etc. When the EVNEG limit is reached in block 232, block 236 decrements SLC from 3 to 2 and step 238 will now pass to blocks 241 and 242 where the flag is reset to indicate the first series of even scan data has been captured, then return.

The pending CA1 IRQ service request is honored and in FIG. 10 the path is blocks 211–215 to 223 where the number of Scans 3, 7, 11, etc. is placed in CAPLMT. Block 224 gets the proper address in the manner of block 217, then blocks 225 and 226 allow CB1 IRQ's as in block 218 except that the CB1 polarity sense is set to positive. Since flip-flop 51 will turn ON (negative to CB1) on Scan 1, it will flip OFF (positive to CB1) on Scan 3, etc.

Figure 11:
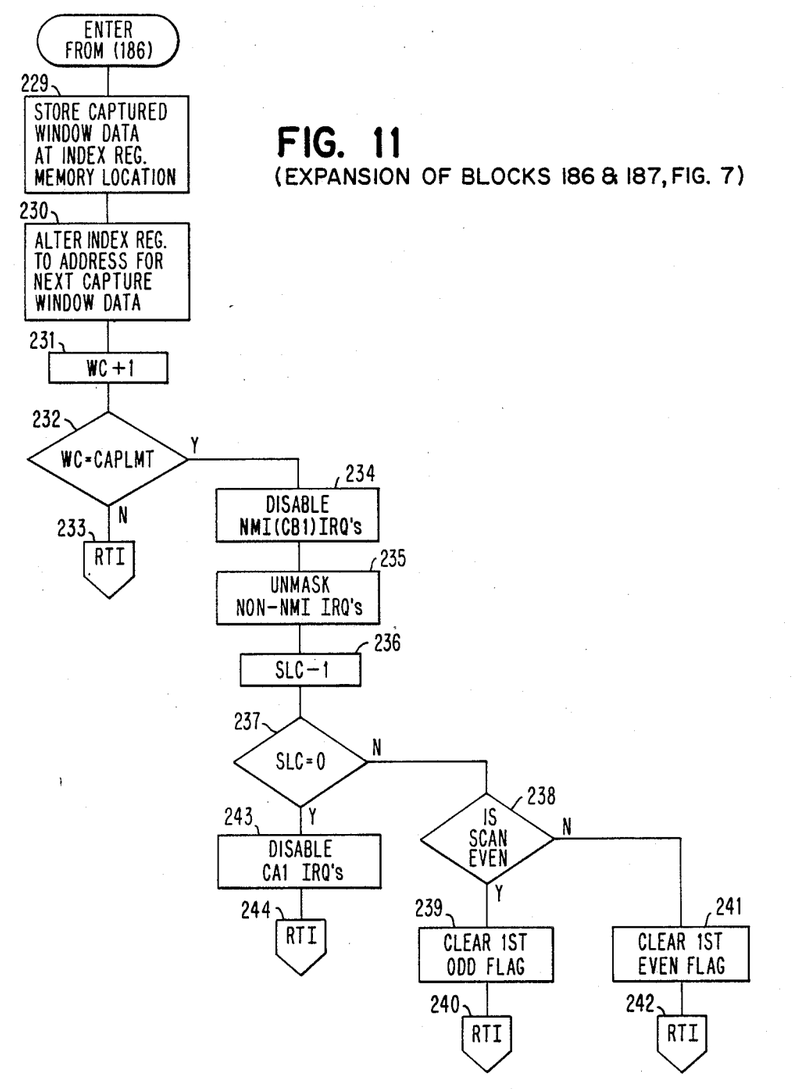

From this point the program of FIG. 11 captures and stores data in Odd scans 3, 7, 11, etc. in manner like that for Odd scans 1, 5, 11, etc. When the ODPOS limit is reached in block 232, block 236 decrements SLC from 2 to 1 and block 238 passes through steps 239 and 240. Step 239 was executed before and, since capture will become complete without further need of the 1st Odd flag ON, clearing it again is irrelevant.

Following this return, the pending CA1 IRQ service request is honored and the path is blocks 211–214 to block 220 and 227 where the number of Scans 2, 6, 10, etc. is placed in CAPLMT. Block 228 then steps 225 and 226 allow CB1 IRQ's as before.

From this point, data is captured and stored in Even scans 2, 6, 10, etc. in manner like that for Odd scans 1, 5, 9, etc. When the EVPOS limit is reached, step 236 decrements SLC from 1 to 0. Decision block 237 now indicates the required four scan field data sets have been captured and stored in memory in the format required to satisfy the impending printout. The program then executes block 243 which prevents any more interrupts from the bit capture circuits. The return through block 244 is to step 210 in FIG. 9 which can now fall through and return to block 138 where the data in the first 16 dots of each display scan results in one printed line. After printing the first line, block 138 will increment PA so it now becomes one. Block 139 will return to step 137 and this entire capture and print process repeats with a PA value of one instead of zero. All data captured this time through is from the second segment of 16 dots from each scan then PA is incremented to 2. This loop continues until the incremented value of PA exceeds LN MAX as determined by the "Count Dots" routine block 151 (FIG. 6); the program then states "Printing is Complete" in block 140 and returns to block 135 to await the next signal to start printing.

What is claimed is:

1. Apparatus for recording on a record member a selected frame of video data appearing on a display device as a plurality of repetitively regenerated scan lines of data bit positions comprising:

a plurality of recording elements moveable relative to said record member, each being selectively energizable according to data bit information supplied thereto for producing corresponding marks on said record member during a recording pass;

means connected to said display device for storing the bit information of those bit positions within a predetermined portion of each of said scan lines from said frame of video data; and readout means for supplying bit information from said storing means and a selected bit position in each said predetermined portion to a corresponding one of said recording elements during a said recording pass thereof.

2. Apparatus as described in claim 1 further comprising means for advancing said storing means to store the bit information of a different predetermined portion of each of said scan lines.

3. Apparatus as described in claim 2 wherein said advancing means includes a counter having a greater count set therein as the selected portion of said lines to be stored advances from one end toward the other of said scan lines.

4. Apparatus as described in claim 1 wherein said storing means selectively stores information bits from identical portions of each of said video scan lines during a said recording pass.

5. Apparatus as described in claim 1 wherein said storing means comprises first counter means settable to a predetermined count for selecting the line portion of data bits of each scan line to be recorded during said recording pass.

6. Apparatus as described in claim 5 further including second counter means having a predetermined capacity corresponding to the number of bits of a selected line portion and effective thereat for decrementing said first counter means, said second counter means being decremented by signals representing bit positions in a said scan line.

7. Apparatus as described in claim 5 including gate means responsive to a predetermined value in said first counter means for enabling transfer of data bits in a said line portion to a storage device.

8. Apparatus as described in claim 1 wherein said means for storing includes means for determining the number of data bit positions in a said scan line.

9. Apparatus as described in claim 1 wherein said means for storing includes means for determining the number of said scan lines in a said selected frame.

10. Apparatus for recording on a record member a selected frame of video data appearing on a display device as a plurality of repetitively generated scan lines of data bit positions comprising:
a plurality of recording elements reciprocable relative to said recorded record member, each selectively energizable according to data bit information supplied thereto for producing corresponding marks on said record member during a recording pass;
means connected to said display device for storing the bit information of those bit positions within a preselected segment of each of said scan lines;
readout means for supplying bit information from said storing means and the same bit position in each of said selected segments to a corresponding one of said print elements during a recording pass thereof; and
means for effecting operation of said storing means for the bit positions in a different segment of said scan lines when a said recording pass is complete.

11. Apparatus as described in claim 10 wherein said storing means includes means for segregating the data for odd and even bit positions in a scanned segment.

12. Apparatus as described in claim 10 wherein said recording elements are arranged in two columns normal to the reciprocating motion thereof and data from said even bit positions in said segregating means is sent to one said column of elements and the data from odd bit positions in said segregating means is sent to the other of said columns.

13. Apparatus as described in claim 10 wherein said storing means further includes means for storing a segment of each of the lines for one group of odd and even scan lines and then the segments of the other group thereof.

14. Apparatus as described in claim 10 wherein said storing means includes means for receiving said segment data bits serially from said scan lines and storing said serial data bits in parallel.

15. Apparatus for selecting and storing the data bit positions in a segment of a scan line of a frame of video data appearing on a display device for use in operating a printer of the dot matrix type from said selected and stored data bit positions and having a bit clock and a data bit supply line comprising:
first counter means settable with a value representing the scan line segment of said bit positions to be stored for printing;
second counter means responsive to said bit clock for counting the bit positions in said scan line and operable to decrement said first counter means by one upon the occurrence of a predetermined count;
storage means connected with said data bit supply line for receiving and storing signals representing said data bits for printing; and
gating means responsive to a predetermined value in said counter means for enabling the transmission of data bits on said supply line to said storage means.

16. Apparatus for use with a dot matrix printer as described in claim 15 further including means responsive to the progression of said first counter means beyond said predetermined value for resetting the same said value in said first counter means.

17. Apparatus for use with a dot matrix printer as described in claim 15 further including means responsive to the progression of said first counter means beyond said predetermined value for setting a greater value in said first counter means.

18. Apparatus for use with a dot matrix printer as in claim 15 further including means in said storage means for receiving said data bit signals serially and storing said signals in parallel.

* * * * *